J. HIERS.
Car-Couplings.
No. 142,230.  Patented August 26, 1873.
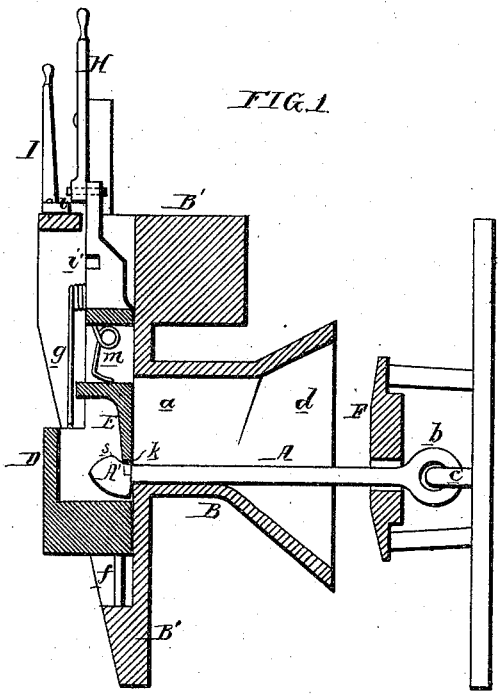
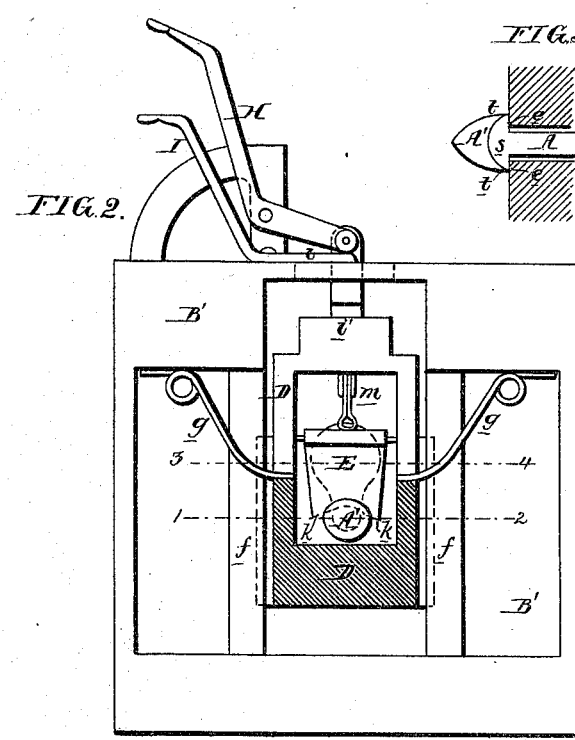
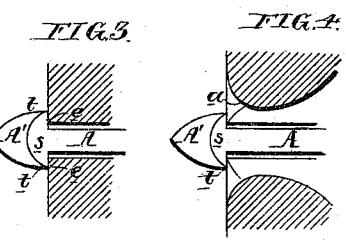
Witnesses, Harry Smith
Thomas McIlvain
John Hiers
by his attys,
Harris and Sus.

UNITED STATES PATENT OFFICE.

JOHN HIERS, OF WEST MANAYUNK, PENNSYLVANIA, ASSIGNOR TO HIMSELF AND JOHN J. FOX, OF SAME PLACE.

IMPROVEMENT IN CAR-COUPLINGS.

Specification forming part of Letters Patent No. 142,230, dated August 26, 1873; application filed March 25, 1873.

*To all whom it may concern:*

Be it known that I, JOHN HIERS, of West Manayunk, Montgomery county, State of Pennsylvania, have invented an Improved Car-Coupling, of which the following is a specification:

The object of my invention is to enable railroad-cars to be automatically coupled together and readily uncoupled.

I attain this object by combining a coupling-bar, A, attached to one car, with a funnel-mouthed head, B, attached to an adjoining car, and having an opening, $a$, for the passage of the coupling-bar, and a vertically-sliding box or frame, D, carrying a pivoted dog, E, for releasing and retaining the said coupling-bar, all as fully described hereafter, and as shown in the sectional elevation, Figure 1, and transverse section, Fig. 2, of the accompanying drawing.

The coupling-bar A has at its outer end an enlargement, A', of the peculiar shape described hereafter, and at its inner end an eye, $b$, by means of which it is connected to a staple, $c$, this method of connection enabling the said bar to be raised and lowered, or turned in any direction, its movements being only limited by the slotted head F, through which it is caused to pass.

The head B has a funnel-shaped mouth, $d$, of sufficient size to receive the end of the coupling-bar and direct it into the opening $a$, whether the cars be of the same or different heights, or in line with, or at an angle in respect to, each other. The opening $a$ is of the peculiar shape best observed in Fig. 2, and in the sectional plans, Figs. 3 and 4—that is, it is enlarged above and contracted below, the rear edges of the enlarged portion being beveled, as shown in Fig. 4, while those of the contracted lower portion form abrupt shoulders $e\ e$, as shown in Fig. 3.

Directly at the rear of the opening $a$, and adapted to vertical guides $f\ f$ in the frame B', to which the head B is attached, or of which it forms a part, is arranged a sliding box or frame, D, acted on by springs $g$, which tend constantly to depress it. This box-like frame is controlled by a lever, H, by means of which it may be raised, and when raised it may be held by a second lever, I, the end $i$ of which is adjusted to a notch, $i'$, in the said frame.

A dog, E, having a curved and beveled lower edge, $k$, is pivoted to and arranged to slide with the frame D, and is constantly acted on by a spring, $m$, which tends to hold it against the opening $a$, which it partially covers.

The enlargement or head A' of the coupling-bar is reduced to a point, as shown, and has a beveled upper edge, $s$, and abrupt shoulders $t\ t$ at the sides.

When the said bar is introduced into the mouth of the head B for the purpose of effecting an automatic coupling of the cars, it passes through the upper enlarged portion of the opening $a$, strikes and pushes back the hinged dog E, and then falls to the position shown in Figs. 1, 2, and 3, the shank of the bar entering the lower contracted portion of the opening $a$, and the shoulders $t\ t$ bearing against the shoulders $e\ e$ at the rear of the said opening, thus firmly retaining the bar and completing the coupling. After the pushing back of the dog E and falling of the coupling-bar, the said dog, acted on by its spring, assumes a position directly over the head of the bar, as shown, and thus prevents the lifting of the same by the jolting of the cars, and the accidental uncoupling of the latter.

When the cars are to be uncoupled, the sliding frame D is raised by means of its lever H sufficiently to bring the head A' of the coupling-bar opposite the enlarged and beveled portion of the opening $a$, as shown in Fig. 4, the said bar being then readily withdrawn, its beveled edge $s$ slipping beneath the curved and beveled edge $k$ of the dog E without resistance.

When it is desired to bring the cars together without coupling the same, as in backing and shifting, &c., the frame D is maintained in an elevated position by means of the lever I, which is adapted to a notch in the said frame, as before described.

I claim as my invention—

1. The pivoted dog E, attached to and sliding with the frame D, and acting as a retainer for the coupling-bar, as specified.

2. The combination, substantially as described, of the retaining-lever I with the sliding frame D, having a notch, $i$, substantially as and for the purpose described.

In testimony whereof I have signed my names to this specification in the presence of two subscribing witnesses.

JOHN $\overset{\text{his}}{+}$ HIERS.
mark.

Witnesses:
WM. A. STEEL,
J. SHERBORNE SINGER.